United States Patent [19]

Nakagawara

[11] Patent Number: 4,796,294

[45] Date of Patent: Jan. 3, 1989

[54] ELECTRONIC TELEPHONE EXCHANGE AND METHOD OF CONNECTING PORTS OF THE EXCHANGE

[75] Inventor: Kyoichi Nakagawara, Hachioji, Japan

[73] Assignee: Kabushiki Kaisha Toshiba, Kawasaki, Japan

[21] Appl. No.: 127,389

[22] Filed: Dec. 2, 1987

[30] Foreign Application Priority Data

Dec. 2, 1986 [JP] Japan .................................. 61-287480

[51] Int. Cl.$^4$ .......................... H04M 3/00; H04Q 1/02
[52] U.S. Cl. ..................................... 379/258; 379/166; 379/269
[58] Field of Search ............... 379/258, 325, 165, 166, 379/284, 269; 370/58, 67, 85

[56] References Cited

U.S. PATENT DOCUMENTS 3,974,343  8/1976  Cheney et al. .................. 379/269 X
4,694,452 11/1987  Beckinger et al. ............. 379/269 X
4,736,409  4/1988  Hasegawa et al. ............. 379/166 X Primary Examiner—James L. Dwyer
Attorney, Agent, or Firm—Finnegan, Henderson, Farabow, Garrett, & Dunner

[57] ABSTRACT

In an electronic telephone exchange and a method of connecting ports of the exchange, highways connected to a time switch is divided into extension highways and office line highways and thus highways are connected to discrete terminals of a connector formed with extension interface circuits and office line interface circuits. Input and output terminals are provided at positions corresponding to the discrete terminals so as to connect the extension interface circuits and the office line interface circuits to corresponding highways through the input and output terminals thereby effecting exchange of communication signals through the highways.

16 Claims, 8 Drawing Sheets

ELECTRONIC TELEPHONE EXCHANGE AND METHOD OF CONNECTING PORTS OF THE EXCHANGE

BACKGROUND OF THE INVENTION

1. Field of the Invention

This invention relates to an electronic telephone exchange and a method of connecting ports of the exchange, and more particularly to an electronic telephone exchange and a method of connecting ports of the exchange wherein an extension interface circuit adapted to connect such terminal device as a telephone set and an office line interface circuit adapted to connect an office line are removably connected through a connector.

2. Description of the Prior Art

As is well known in the art, the electronic telephone exchange is constituted by a time switch adapted to exchange connections bewween extensions and between an office line and an extension, a control device for controlling the exchange connection operation by the time switch, and interface circuits each connected to the highway of the time switch for exchanging communication signals between time switches of corresponding terminal devices through the highway.

For the users of such electronic telephone exchange, there are a case in which many extensions are necessary but the number of the office lines may be small and a case wherein a large number of the office lines are necessary but the number of the extensions may be small. Therefore, it is convenient to construct the telephone exchange such that the number of the extensions and the number of the office lines can be varied according to the needs of a user.

Consequently, a flexible port type electronic telephone exchange has been proposed in which each interface circuit connected to the highway of the time switch can be selectively used for the extension or the office line by changing the address number (port number) assigned to each interface circuit.

In the flexible type electronic telephone exchange, since the port number of the interface circuit is changed by software, there is a problem of complicating the software. Moreover, in a system wherein the port number is fixed, when it is desired to change the telephone system to the flexible port type, it is necessary to develop new software, which requires time and cost.

SUMMARY OF THE INVENTION

Accordingly, it is an object of this invention to provide an improved electronic telephone exchange and a port connecting method, capable of readily realizing a flexible port type without complicating the software or preparing a new software.

In an electronic telephone exchange and a method of connecting ports of the exchange, highways connected to a time switch to divided into extension highways and office line highways and thus highways are connected to discrete terminals of a connector formed with extension interface circuits and office line interface circuits. Input and output terminals are provided at positions corresponding to the discrete terminals so as to connect the extension interface circuits and the office line interface circuits to corresponding highways through the input and output terminals thereby effecting exchange of communication signals through the highways.

More particularly, the office line highway and the extension highway are connected to the connector at different terminals. When the terminal of the extension interface circuit is fitted into the connector, the input/output terminal of the extension interface circuit becomes in touch with the terminal connected to the extension highway so as to connect the extension interface circuit to the extension highway.

When the terminal of the office line interface circuit is fitted into the connector, the input/output terminal of the office line interface circuit becomes in touch with the terminal connected to the office line highway so as to connect the office line interface circuit to the office line highway. Thus, by connecting either an extension interface circuit or an office line interface circuit to the connector, desired number of the extension interface circuit and the office line interface circuit can be used.

DESCRIPTION OF THE PREFERRED EMBODIMENTS

Figure 1:
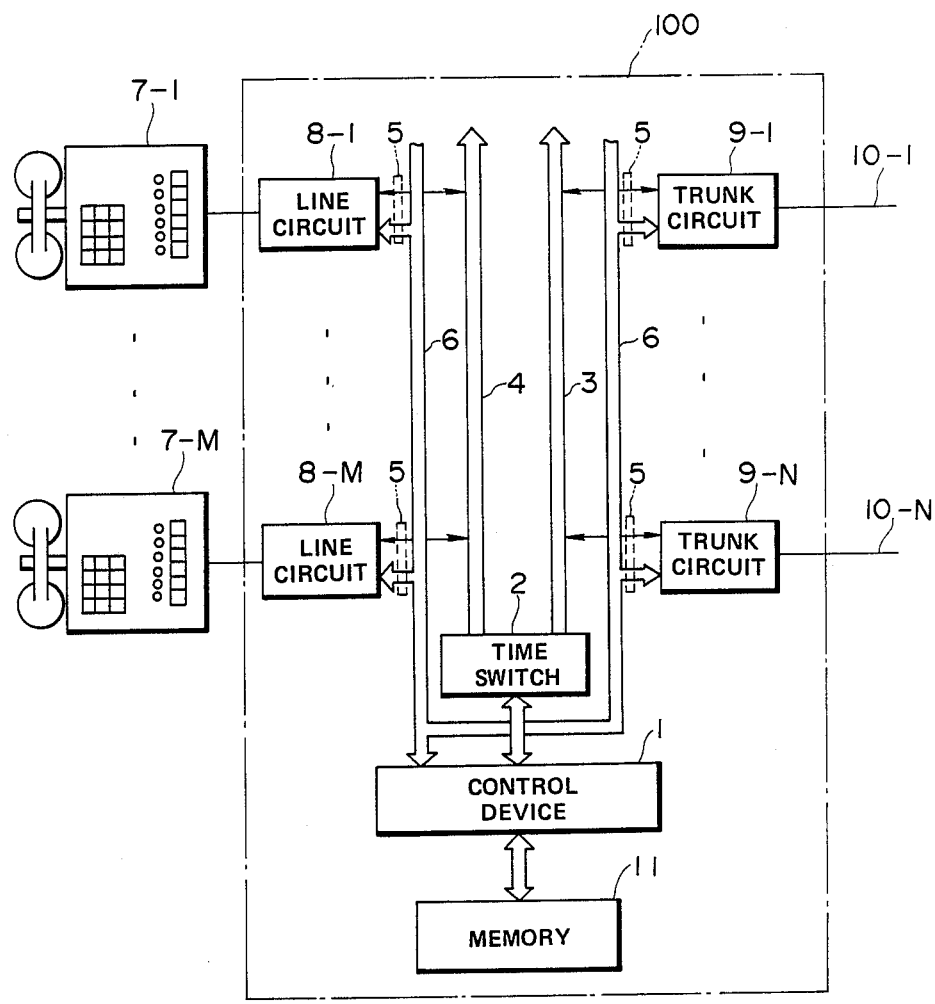
FIG. 1 is a block diagram showing one embodiment of this invention.

An electronic telephone exchange 100 shown in FIG. 1 comprises M line circuits (LC) 8-1~8-M acting as extension interface circuits and N trunk circuits (TRK) 9-1~9-N and is constructed to be connected with M terminal devices 7-1~7-M such as telephone sets, and N office lines 10-1~10-N. As will be described later in more detail, M line circuits 8-1~8-M and N trunk circuits 9-1~9-N are connected to an extension highway 4 and a bus line 6 or an office line highway 3 and bus line 6 respectively through connectors 5. The line circuit number M and the trunk circuit number N can be changed to any numbers according to the number of circuits connected to the connectors 5.

The electronic telephone exchange 100 is provided with a time switch 2 connected to the office line highway 3 and the extension highway 4. The office line highway 3 is connected to the trunk circuits 9-1~9-N via connectors 5, while the extension highway 4 is connected to the line circuits 8-1~8-M through connectors 5.

The trunk circuits 9-1~9-N and line circuits 8-1~8-M are connected to the control device 1 through connectors 5 and bus line 6.

The control device 1 controls the exchange operation of time switch 2, and trunk circuits 9-1~9-N and line circuits 8-1~8-M through bus line 6. A control program of the control device 1 and information necessary for the control are stored in a memory device 11.

Figure 2:
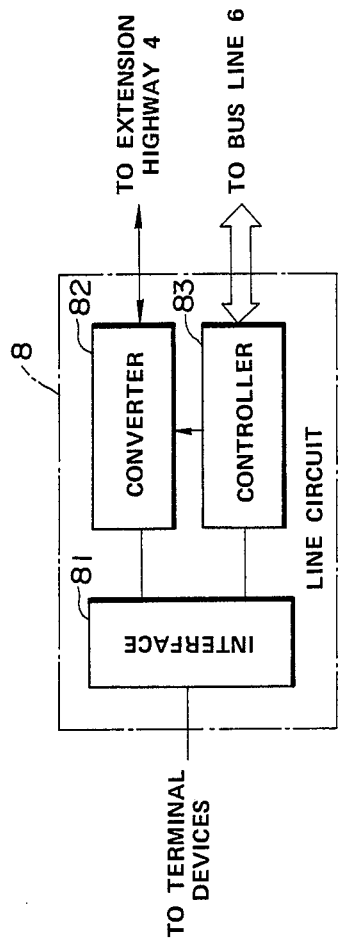
FIG. 2 is a block diagram showing the detail of the line circuit of the embodiment shown in FIG. 1.

Each line circuit 8 acting as a extension interface circuit is constructed as shown in FIG. 2. More particularly the line circuit 8 is constituted by an interface 81, a converter 82 and a controller 83. The converter 82 operates to convert information suitable for a terminal device among comnunication information to information suitable for the electronic telephone exchange and to convert the information suitable for the electronic telephone exchange to information suitable for the terminal device, while the controller 83 controls the conversion operation of the converter 82 based on control information from the control device 1 and control information from the terminal device via interface 81.

Figure 3:
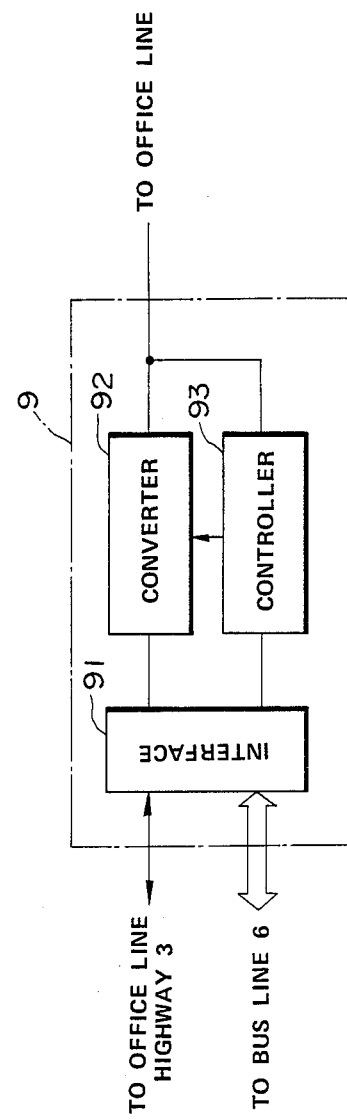
FIG. 3 is a block diagram showing the detail of the trunk circuit of the embodiment shown in FIG. 1.

Each trunk circuit 9 acting as the office line interface circuit is constructe as shown in FIG. 3. More particularly, the trunk circuit 9 is constituted by an interface 91, a converter 92 and a controller 93. The converter 92 operates to convert information suitable for the office line among the communication information to information suitable for the electronic telephone exchange and to convert the information suitable for the electronic telephone exchange to information suitable for the office line, while the controller 93 controls the conversion operation of the converter 92 based on control information from an office line and control information from the control device via interface 91.

Figure 4:
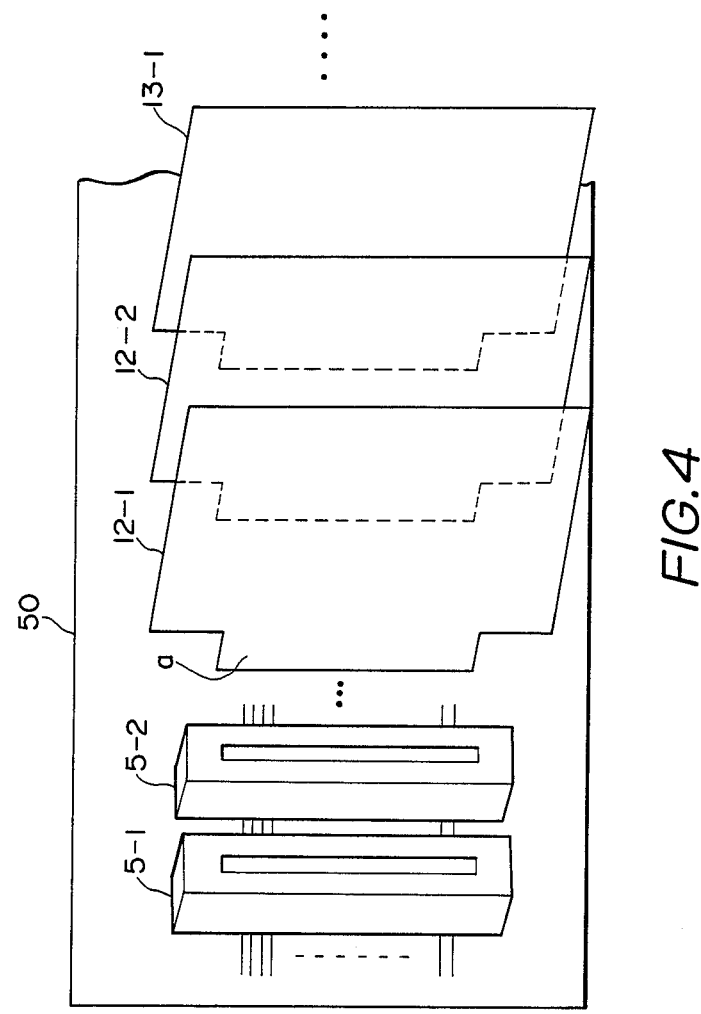
FIG. 4 is a perspective view showing a portion of the connector utilized in the embodiment shown in FIG. 1.
Figure 9:
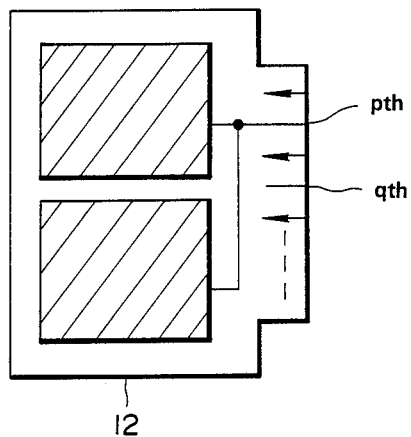
FIG. 9 is a plan view showing another example of the construction of the line circuit substrate utilized in the embodiment shown in FIG. 1.

FIG. 4 shows a wiring mode of the connector 5 shown in FIG. 1. As shown, the connector 5 comprise a plurality of connector sections 5-1, 5-2, which are arranged on a mother board 50 in a single or a plurality of rows. Respective line circuits 8-1~8-M and respective trunk circuits 9-1~9-N are mounted on substrates 12-1, 12-2 and 13-1 . . . , as shown in FIG. 9, respective substrates being formed with terminals a to be inserted into connector sections 5-1, 5-2 . . . The circuits or respective substrates are connected to the bus line 6 by fitting terminals a to connector sections 5-1, 5-2 . . . and to the office line highway 3 or the extension highway 4.

Figure 5:
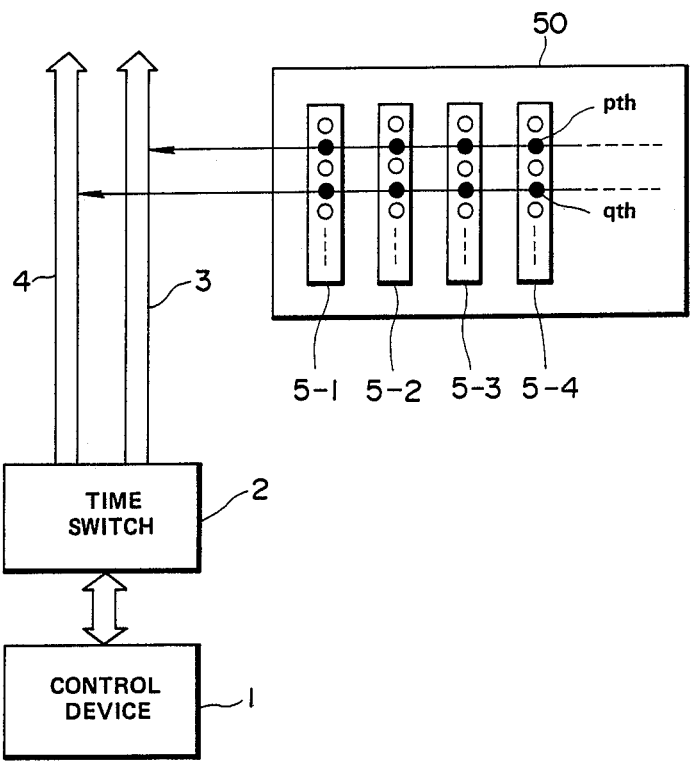
FIG. 5 is a block diagram showing the construction of the connector utilized in the embodiment shown in FIG. 1.

FIG. 5 shows connections between terminals of connector sections 5-1, 5-2, 5-3, 5-4 and the office line highway 3 and extension highway 4. In FIG. 5, connections to the bus line 6 are not shown. More particularly, a specific terminal of connector sections 5-1, 5-2 . . . , in this case the pth terminal, is connected to the office line highway and another specific terminal of connector sections 5-1, 5-2 . . . , in this case the qth terminal, is connected to the extension highway.

Figure 6:
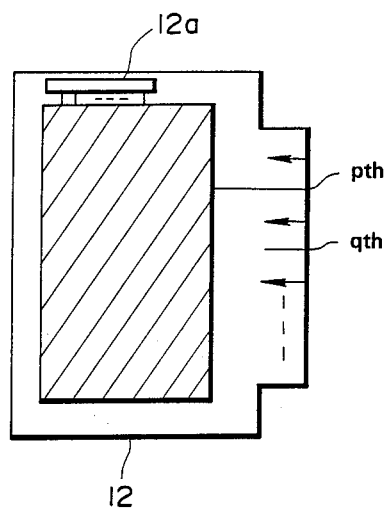
FIG. 6 is a plan view showing one example of the construction of the line circuit substrate utilized in the embodiment shown in FIG. 1.
Figure 7:
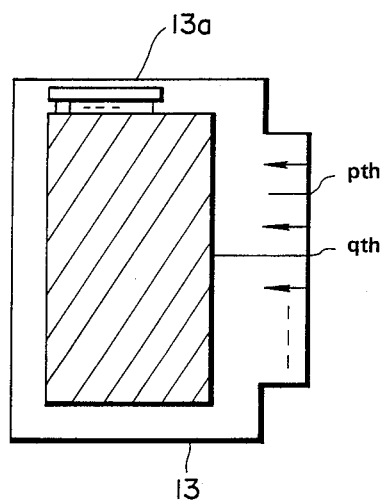
FIG. 7 is a plan view showing the construction of the trunk circuit substrate utilized in the embodiment shown in FIG. 1.

FIG. 6 is a plan view showing the circuit substrate 12 accommodating the office line interface circuit, while FIG. 7 is a plan view showing the circuit substrate 13 accommodating the extension interface circuit. As shown in FIG. 6, in the substrate 12 of the office line interface circuit, the pth terminal of the connection terminals is connected to the internal circuit, but the qth terminal is not connected to the internal circuit. Further in the substrate 13 of the extension interface circuit, the qth terminal is connected to the internal circuit but the pth terminal is not connected to the internal circuit.

Consequently, when the substrate of the office line interface circuit is fitted to any one of the connector sections 5-1~5-4, the internal circuit of the substrate of the office line interface circuit is connected to the office line highway 3 via the pth terminal of the substrate 12 and the pth terminal of the fitted connector.

Thus, since the qth terminal of the substrate 12 is not connected to the internal circuit of the substrate 12, the internal circuit of the substrate 12 would not be connected to the extension interface circuit 4 through the qth terminal of the connector.

Where the substrate 13 of the extension interface circuit is fitted to any one of the connector sections 5-1, 5-2, 5-3, 5-4 . . . , the internal circuit of the substrate 13 of the extension interface circuit 13 would be connected to the extension highway 3 via the qth terminal of the substrate 13 and the qth terminal of the fitted connector.

In this case too, as the pth terminal of the substrate 13 is not connected to the internal circuit of the substrate 13, the internal circuit of the substrate 13 would not be connected to the office line interface circuit 3 via the pth terminal of the connector.

The substrates 12 and 13 are respectively provided with switches 12a and 13a for independently setting addresses. The control device 1 shown in FIG. 11 reads the address of a substrate inserted in the initial state through the bus line 6 and this read address is stored in the memory device 11. The control of the line circuit and the trunk of a subsequently inserted substrate is effected by this address.

Figure 8:
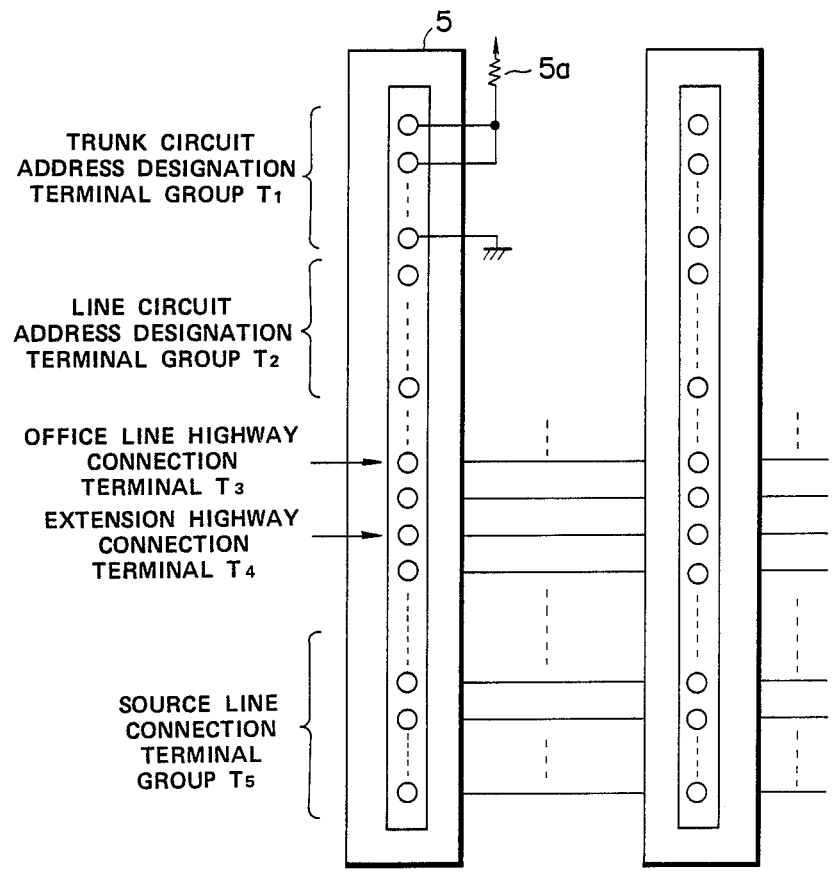
FIG. 8 is a diagrammatic representation showing one example of the construction of the connector utilized in the embodiment shown in FIG. 1.

FIG. 8 shows the detail of one example of the terminal construction of connector 5. The terminal construction shown in FIG. 8 comprises a trunk circuit address designation terminal group $T_3$, a line circuit address designation terminal group $T_2$, an office line highway connection terminal group $T_3$ (corresponding to the pth terminal shown in FIG. 5), an extension highway connection terminal group $T_4$ (corresponding to the qth terminal shown in FIG. 5), and a source line connection terminal group $T_5$. The trunk circuit address designation terminal group $T_2$ and the line circuit address designation terminal group $T_2$ are used to designate the address of the trunk circuit or the line circuit of a substrate fitted to the connector. Thus, the terminal shown in FIG. 8 is constructed such that the address of the circuit of the substrate fitted to the connector is designated. In this case, it is not necessary to provide switches 12a and 13a for setting addresses (see FIGS. 6 and 7) for the substrate.

In one example of the trunk circuit address designation terminal group $T_1$ shown in FIG. 8, respective terminals of group $T_3$ are connected to the source or ground via pull-up resistors 5a for setting an address of a predetermined number of bits. This address setting circuit is formed in the connector 5 or on the mother board 50.

With this construction, when the terminal of a substrate is connected to a connector, a control device, not shown, of the circuit of the substrate reads and stores an address in the trunk circuit address designation terminal group $T_1$ or the line circuit address designation terminal group $T_2$ of the connector. Therefore, this circuit is controlled in accordance with this address.

Figure 10:
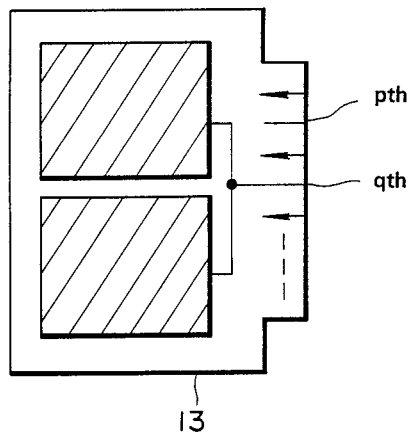
FIG. 10 is a plan view showing another example of the construction of the trunk circuit substrate utilized in the embodiment shown in FIG. 1.

FIGS. 6 and 7 show a construction wherein one trunk circuit and one line circuit are formed respectively on the substrates 12 and 13, but a plurality of circuits can be formed on each substrate. In FIGS. 9 and 10, two trunk circuits and two line circuits are formed on each substrate.

Figure 11:
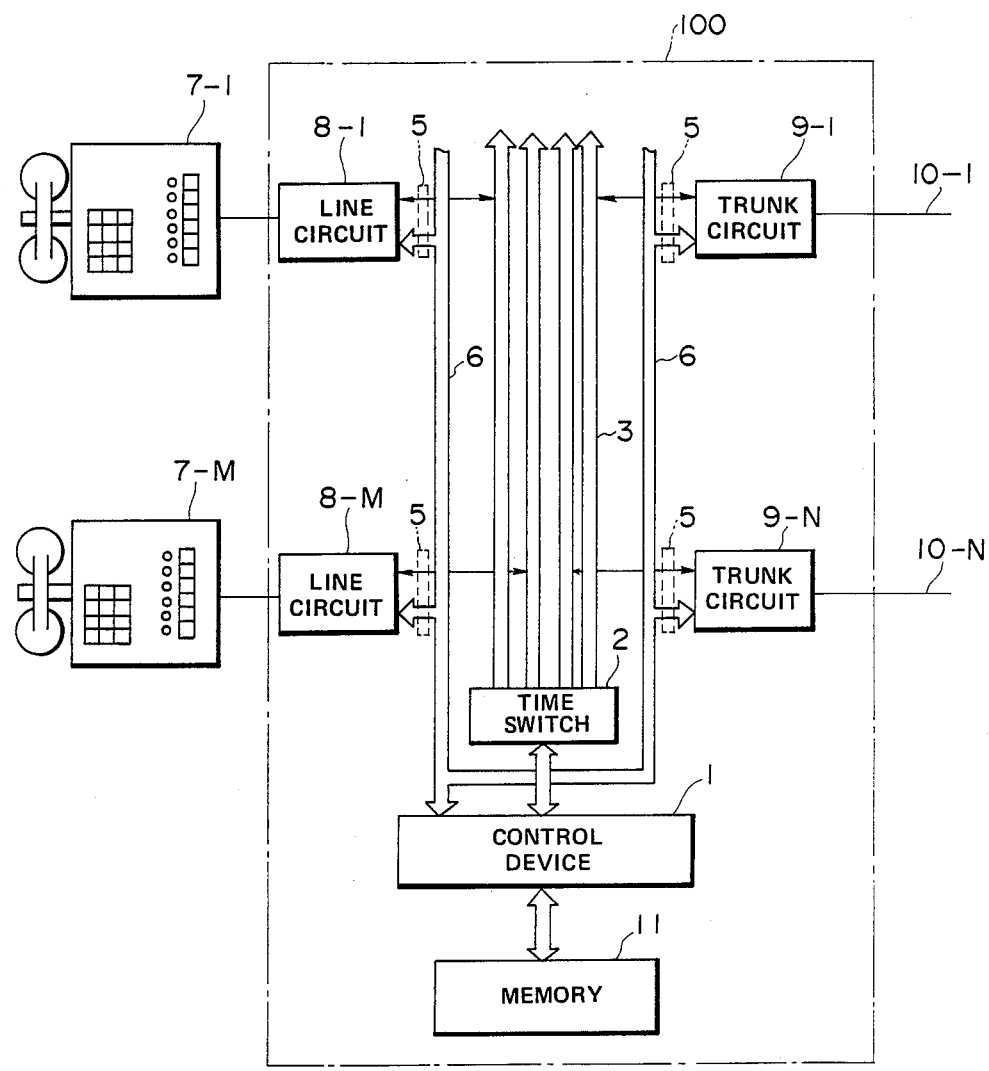
FIG. 11 is a block diagram showing another embodiment of this invention.

In the construction shown in FIG. 1, the line switch 2 is provided for one office line highway 3 and one extension highway 4, it should be understood that a plurality of office line highways and a plurality of extension highways can be provided for one time switch 2 as shown in FIG. 11. In this case, which one of the highways should be connected to the circuit is determined by the connector and the terminal construction of a circuit substrate fitted to the connector.

What is claimed is:

1. An electronic telephone exchange comprising:
   a time switch for effecting exchange connections at least between an office line and an extension and between extensions;
   an extension highway connected to said time switch;
   an office line highway connected to said time switch;
   a plurality of connectors with a specific first terminal connected to said extension highway and a specific second terminal connected to said office line highway;
   at least one extension interface circuit each mounted on a substrate and having a terminal for connecting said extension highway at a position corresponding to the first terminal of said connector; said extension interface circuit being fitted to either one of said plurality of connectors so as to be connected with said extension highway via said first terminal;
   at least one office line interface circuit mounted on a substrate and having a terminal for connecting an office line highway at a position corresponding to said second terminal of said connector, said office line interface circuit being fitted to either one of said connectors so as to be connected to said office line highway via said second terminal;
   address designation means for designating addresses of said extension interface circuit and of said office line interface circuit; and
   control means for controlling an exchange connection operation of said time switch and for controlling said extension interface circuit and said office line interface circuit based on the addresses designated by said address designation means.

2. The electronic telephone exchange according to claim 1 wherein said plurality of connectors are arranged in one or a plurality of rows on a mother board.

3. The electronic telephone exchange according to claim 1 wherein said extension interface circuit has terminals of the same number as those of said office line interface circuit and wherein a terminal at a position corresponding to said second terminal is not connected to said internal circuit.

4. The electronic telephone exchange according to claim 1 wherein said office line interface circuit has terminals of the same number as those of said extension interface circuit and wherein a terminal at a position corresponding to said first terminal is not connected to said internal circuit.

5. The electronic telephone exchange according to claim 1 wherein said extension interface circuit and said office line interface circuit have the same configuration.

6. The electronic telephone exchange according to claim 1 wherein said connector has an address designation terminal group, said first terminal connected to said extension highway, said second terminal connected to said office line highway, and a terminal group connected to said control bus line.

7. The electronic telephone exchange according to claim 6 wherein said address designation terminal group comprises a first terminal group for designating an address of said extension interface circuit, and a second terminal group for designating an address of said office line interface circuit.

8. The electronic telephone exchange according to claim 1 wherein addresses are preset for respective connectors, and said address desigaation means designates addresses set in respective connectors for said extension interface circuit or said office line interface circiit.

9. The electronic telephone exchange according to claim 8 wherein said designation by said address designation means is made through said address designation terminal group.

10. The electronic telephone exchange according to claim 8 wherein said designation by said address designation means is made through said terminal group for designating addresses of said extension interface circuit and said second terminal group for designating addresses of said office line interface circuit.

11. The electronic telephone exchange according to claim 1 wherein said address designation means is provided in said extension interface circuit and said office line interface circuit respectively.

12. The electronic telephone exchange according to claim 1 wherein said extension interface circuit comprises a plurality of circuits formed on a single substrate.

13. The electronic telephone exchange according to claim 1 wherein said office line interface circuit comprises a plurality of circuits formed on a single substrate.

14. The electronic telephone exchange according to claim 1 wherein said extension highway is made up of a plurality of highways.

15. The electronic telephone exchange according to claim 1 wherein said office line highway is made up of a plurality of highways.

16. A method of connecting ports of an electronic telephone exchange comprising:
   a time switch for effecting exchange connections at least between an office line and an extension and between extensions;
   control means for controlling an exchange connection of said time switch;
   interface circuits for respective terminal devices, said interface circuits being connected to highways of said time switch for effecting exchange of communication signals between corresponding terminal devices and said time switch through said highways;
   said interface circuits being assigned with inherent address numbers;
   said control means identifying whether said interface circuits are the office line interface circuits or the extension interface circuits according to said address numbers for effecting exchange connections,
   said highways being divided into extension highways and office line highways;
   said highways being connected to terminals of connectors respectively formed with said extension interface circuits and said office line interface circuits;
   said extension interface circuits and said office line interface circuits being connected to corresponding highways through internal wirings between said interface circuits and said terminals so as to exchange communication signals through said highways.

* * * * *